United States Patent
Padron et al.

(10) Patent No.: US 12,478,697 B2
(45) Date of Patent: Nov. 25, 2025

(54) SYSTEM AND METHOD FOR SANITIZING OBJECTS IN AN INDOOR GARDENING APPLIANCE

(71) Applicant: Haier US Appliance Solutions, Inc., Wilmington, DE (US)

(72) Inventors: Jose Rafael Padron, Louisville, KY (US); Kira Lynn Hartlage, Crestwood, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 772 days.

(21) Appl. No.: 17/829,402

(22) Filed: Jun. 1, 2022

(65) Prior Publication Data
US 2023/0390434 A1    Dec. 7, 2023

(51) Int. Cl.
*A61L 2/10* (2006.01)
*A01G 9/02* (2018.01)

(52) U.S. Cl.
CPC ............... *A61L 2/10* (2013.01); *A01G 9/023* (2013.01)

(58) Field of Classification Search
CPC .......... A61L 2/10; A61L 2/0047; A01G 9/023
See application file for complete search history.

(56) References Cited

U.S. PATENT DOCUMENTS

| | | | |
|---|---|---|---|
| 8,847,174 B2 | 9/2014 | Domenig et al. | |
| 9,974,243 B2 | 5/2018 | Martin et al. | |
| 10,499,574 B2 | 12/2019 | Lu et al. | |
| 2020/0037526 A1* | 2/2020 | Sperry | A01G 9/025 |

FOREIGN PATENT DOCUMENTS

| | | | | |
|---|---|---|---|---|
| CN | 108496650 A | * | 9/2018 | |
| KR | 101816243 B1 | | 1/2018 | |
| KR | 20180038910 A | | 4/2018 | |
| RU | 2248120 C2 | * | 3/2005 | |
| SI | 25108 A | | 6/2017 | |
| WO | WO-2020041242 A1 | * | 2/2020 | A01G 31/04 |

OTHER PUBLICATIONS

Translation of CN-108496650 A (Year: 2018).*
Translation of RU 2248120 C2 (Year: 2005).*

* cited by examiner

Primary Examiner — Sean E Conley
(74) Attorney, Agent, or Firm — Dority & Manning, P.A.

(57) ABSTRACT

A method for sanitizing objects within a gardening appliance includes: positioning at least one object on a grow tower of the gardening appliance; during a sanitization cycle, rotating the grow tower such that the at least one object on the grow tower is exposed to an ultraviolet assembly of the gardening appliance; activating the ultraviolet assembly such that the at least one object on the grow tower is illuminated by ultraviolet rays from the ultraviolet assembly; and after the sanitization cycle, removing the at least one object from the grow tower. A related gardening appliance is also provided.

19 Claims, 10 Drawing Sheets

SYSTEM AND METHOD FOR SANITIZING OBJECTS IN AN INDOOR GARDENING APPLIANCE

FIELD OF THE INVENTION

The present subject matter relates generally to systems for gardening plants indoors, and more particularly, to systems and methods for sanitizing objects within an indoor gardening appliance.

BACKGROUND OF THE INVENTION

Conventional indoor garden centers include a cabinet defining a grow chamber having a number of trays or racks positioned therein to support seedlings or plant material, e.g., for growing herbs, vegetables, or other plants in an indoor environment. In addition, such indoor garden centers may include an environmental control system that maintains the growing chamber at a desired temperature or humidity. Certain indoor garden centers may also include hydration systems for watering the plants and/or artificial lighting systems that provide the light necessary for such plants to grow.

Indoor garden centers are generally specific-use items, i.e., are only used to grow plants. Thus, indoor garden centers can occupy an area within a residence while only being used to grow plants. While growing plants is highly beneficial, the space commitment can be significant for some users.

Accordingly, an improved indoor garden center would be useful. More particularly, an indoor garden center with features for performing additional tasks would be particularly beneficial.

BRIEF DESCRIPTION OF THE INVENTION

Aspects and advantages of the invention will be set forth in part in the following description, or may be apparent from the description, or may be learned through practice of the invention.

In an example embodiment, a method for sanitizing objects within a gardening appliance includes: positioning at least one object on a grow tower of the gardening appliance; during a sanitization cycle, rotating the grow tower such that the at least one object on the grow tower is exposed to an ultraviolet assembly of the gardening appliance; activating the ultraviolet assembly such that the at least one object on the grow tower is illuminated by ultraviolet rays from the ultraviolet assembly; and after the sanitization cycle, removing the at least one object from the grow tower.

In another example embodiment, a gardening appliance includes a cabinet and a grow tower rotatably mounted within the cabinet. The grow tower defines a plurality of apertures configured for receiving a plurality of plant pods. An ultraviolet assembly is operable for selectively illuminating the grow tower with ultraviolet rays. A controller is in communication with the ultraviolet assembly. The controller is configured for: activating a motor to rotate the grow tower during a sanitization cycle; activating the ultraviolet assembly to expose at least one object on the grow tower to ultraviolet rays from the ultraviolet assembly during the sanitization cycle; and deactivating the motor and the ultraviolet assembly after the sanitization cycle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
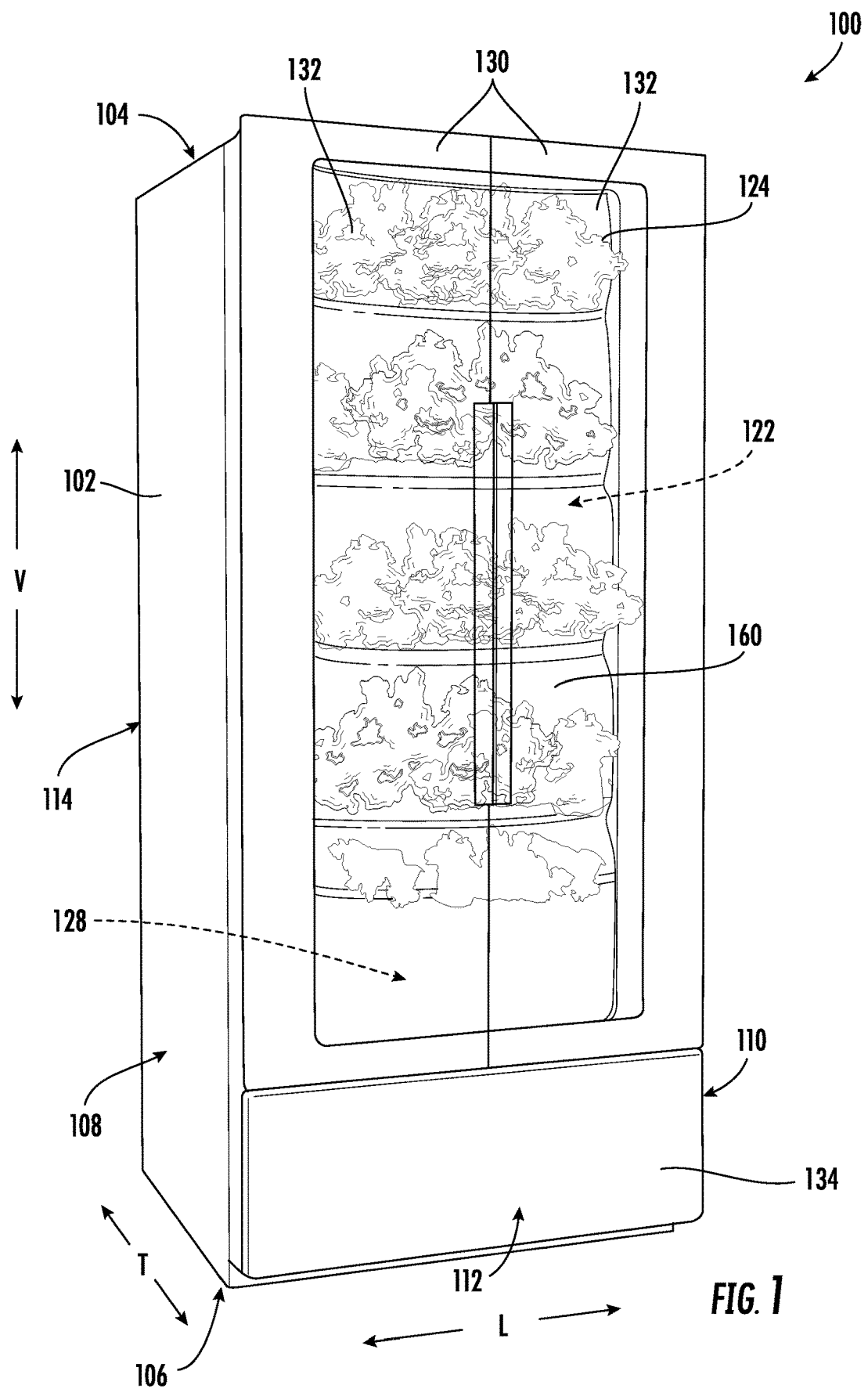
FIG. 1 is a perspective view of a gardening appliance according to an example embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the figures, a gardening appliance 100 will be described in accordance with exemplary aspects of the present subject matter. According to exemplary embodiments, gardening appliance 100 may be used as an indoor garden center for growing plants. It should be appreciated that the embodiments described herein are intended only for explaining aspects of the present subject matter. Variations and modifications may be made to gardening appliance 100 while remaining within the scope of the present subject matter.

According to exemplary embodiments, gardening appliance 100 includes a cabinet 102 that is generally configured for containing and/or supporting various components of gardening appliance 100 and which may also define one or more internal chambers or compartments of gardening appliance 100. In this regard, as used herein, the terms "cabinet," "housing," and the like are generally intended to refer to an outer frame or support structure for gardening appliance 100, e.g., including any suitable number, type, and configuration of support structures formed from any suitable materials, such as a system of elongated support members, a plurality of interconnected panels, or some combination thereof. It should be appreciated that cabinet 102 does not necessarily require an enclosure and may simply include open structure supporting various elements of gardening appliance 100. By contrast, cabinet 102 may enclose some or all portions of an interior of cabinet 102. It should be appreciated that cabinet 102 may have any suitable size, shape, and configuration while remaining within the scope of the present subject matter.

As illustrated, gardening appliance 100 generally defines a vertical direction V, a lateral direction L, and a transverse direction T, each of which is mutually perpendicular, such that an orthogonal coordinate system is generally defined. The horizontal direction is generally intended to refer to a direction perpendicular to the vertical direction V (e.g., within a plane defined by the lateral direction L and the transverse direction T). Cabinet 102 generally extends between a top 104 and a bottom 106 along the vertical direction V, between a first side 108 (e.g., the left side when viewed from the front as in FIG. 1) and a second side 110 (e.g., the right side when viewed from the front as in FIG. 1) along the lateral direction L, and between a front 112 and a rear 114 along the transverse direction T. In general, terms such as "left," "right," "front," "rear," "top," or "bottom" are used with reference to the perspective of a user accessing gardening appliance 100.

Gardening appliance 100 may include an insulated liner 120 positioned within cabinet 102. Liner 120 may at least partially define an internal temperature-controlled chamber, referred to herein generally as a climate-controlled chamber 122, within which plants 124 may be grown. Although gardening appliance 100 is referred to herein as growing plants 124, it should be appreciated that other organisms or living things may be grown or stored in gardening appliance 100. For example, algae, fungi (e.g., including mushrooms), or other living organisms may be grown or stored in gardening appliance 100. The specific application described herein is not intended to limit the scope of the present subject matter in any manner.

Cabinet 102, or more specifically, liner 120 may define a substantially enclosed back portion 126 (e.g., proximate rear 114 of cabinet 102). In addition, cabinet 102 and liner 120 may define a front opening, referred to herein as front display opening 128 (e.g., proximate front 112 of cabinet 102), through which a user of gardening appliance 100 may access climate-controlled chamber 122, e.g., for harvesting, planting, pruning, or otherwise interacting with plants 124. According to an exemplary embodiment, enclosed back portion 126 may be defined as a portion of liner 120 that defines climate-controlled chamber 122 proximate rear side 114 of cabinet 102. In addition, front display opening 128 may generally be positioned proximate or coincide with front side 112 of cabinet 102.

Figure 2:
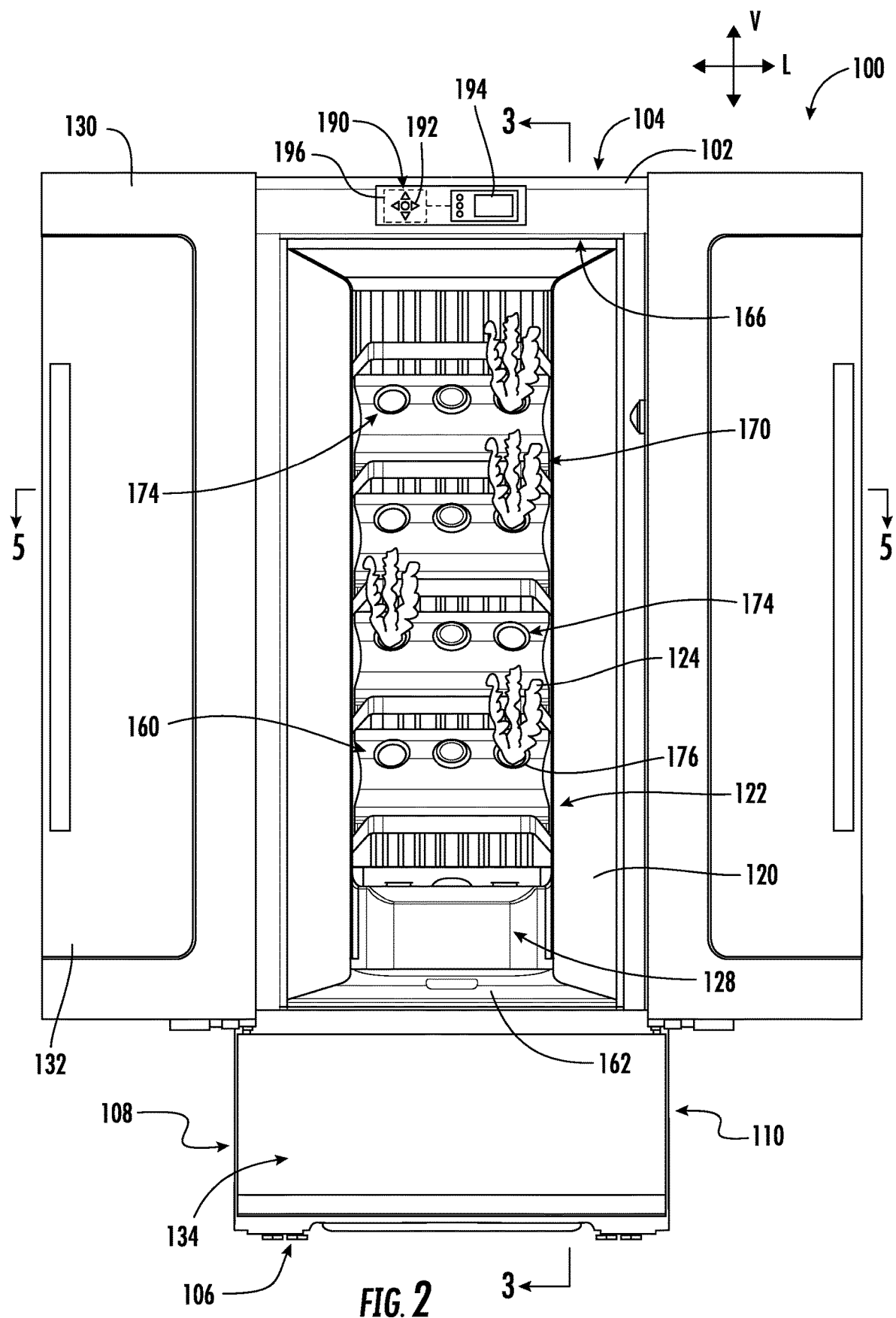
FIG. 2 is a front view of the example gardening appliance of FIG. 1 with the doors shown open.

Gardening appliance 100 may further include one or more doors 130 that are rotatably mounted to cabinet 102 for providing selective access to climate-controlled chamber 122. For example, FIG. 1 illustrates doors 130 in the closed position such that they may help insulate climate-controlled chamber 122. By contrast, FIG. 2 illustrates doors 130 in the open positioned to permit access to climate-controlled chamber 122 and plants 124 stored therein. Doors 130 may further include a transparent window 132 through which a user may observe plants 124 without opening doors 130.

Although doors 130 are illustrated as being rectangular and being mounted on front side 112 of cabinet 102 in FIGS. 1 and 2, it should be appreciated that according to alternative embodiments, doors 130 may have different shapes, mounting locations, etc. For example, doors 130 may be curved, may be formed entirely from glass, etc. In addition, doors 130 may have integral features for controlling light passing into and/or out of climate-controlled chamber 122, such as internal louvers, tinting, UV treatments, polarization, etc. One skilled in the art will appreciate that other chamber and door configurations are possible and within the scope of the present subject matter.

According to the illustrated embodiment, cabinet 102 further defines a drawer 134 positioned proximate bottom 106 of cabinet 102 and being slidably mounted to cabinet 102 for providing convenient storage for plant nutrients, system accessories, water filters, etc. In addition, behind drawer 134 is a mechanical compartment 136 for receipt of an environmental control system including a sealed system for regulating the temperature within climate-controlled chamber 122, as described in more detail below.

Figure 3:
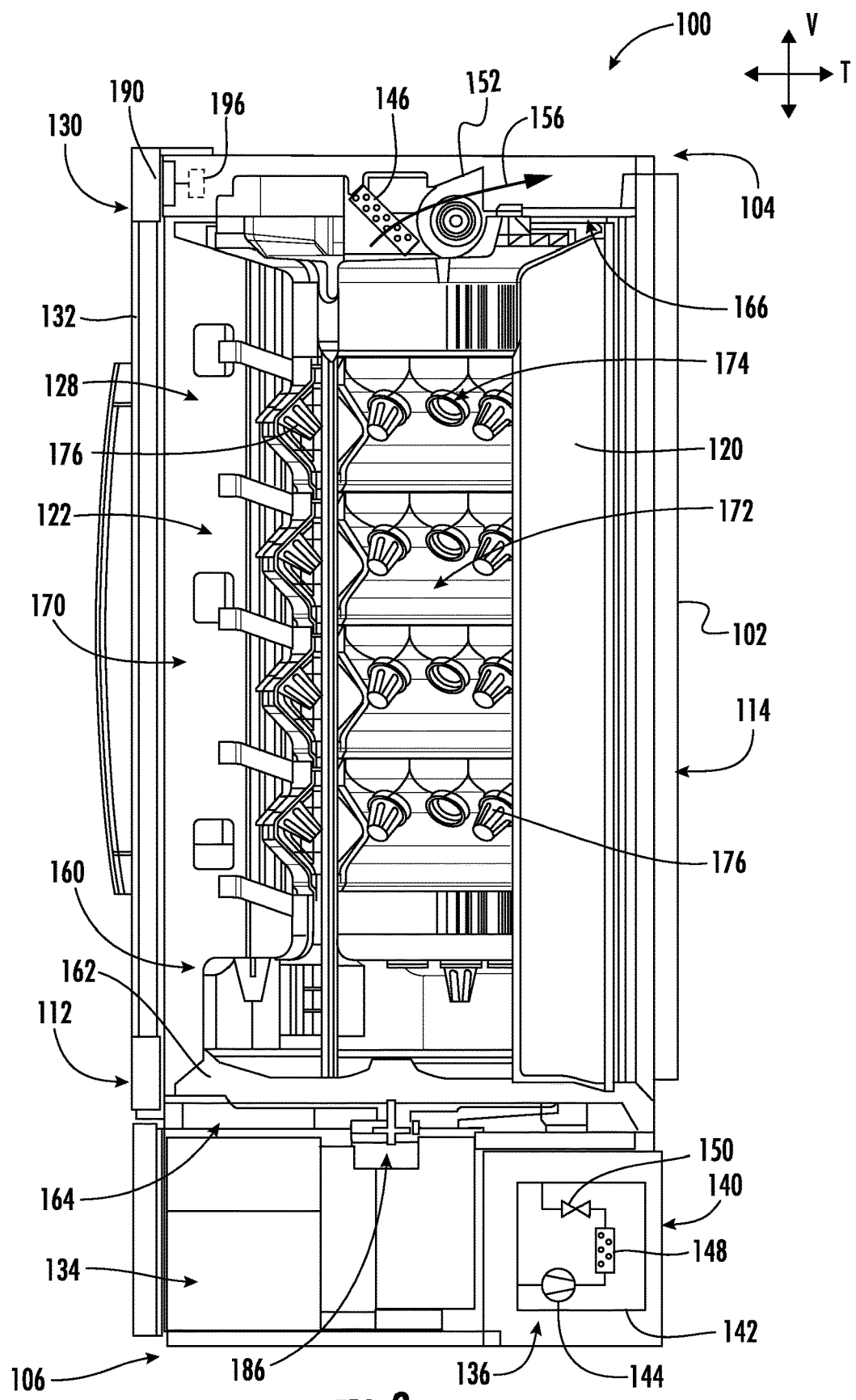
FIG. 3 is a section view of the example gardening appliance of FIG. 1 taken along Line 3-3 in FIG. 2.

FIG. 3 provides a schematic view of certain components of an environmental control system 140 that may be used to regulate a climate or environment within climate-controlled chamber 122. Specifically, environmental control system 140 may include one or more subsystems for regulating temperature, humidity, hydration, nutrient dosing, lighting, and any other aspects of the environment within one or more portions of climate-controlled chamber 122, e.g., as desired to facilitate improved or regulated growth of plants 124 positioned therein. Although exemplary subsystems and subsystem configurations are described below, it should be appreciated that aspects of environmental control system 140 may vary while remaining within the scope of the present subject matter.

As illustrated, environmental control system 140 includes a sealed system 142 that is generally configured for regulating a temperature and/or humidity within one or more regions of climate-controlled chamber 122. In this regard, as shown schematically in FIG. 3, sealed system 142 may be located partially within mechanical compartment 136 and includes a compressor 144, a first heat exchanger or evaporator 146 and a second heat exchanger or condenser 148. As is generally understood, compressor 144 is generally operable to circulate or urge a flow of refrigerant through sealed system 142, which may include various conduits which may be utilized to flow refrigerant between the various components of sealed system 142. Thus, evaporator 146 and condenser 148 may be between and in fluid communication with each other and compressor 144.

During operation of sealed system 142, refrigerant flows from evaporator 146 and to compressor 144. For example, refrigerant may exit evaporator 146 as a fluid in the form of a superheated vapor. Upon exiting evaporator 146, the refrigerant may enter compressor 144, which is operable to compress the refrigerant and direct the compressed refrigerant to condenser 148. Accordingly, the pressure and temperature of the refrigerant may be increased in compressor 144 such that the refrigerant becomes a more superheated vapor.

Condenser 148 is disposed downstream of compressor 144 and is operable to reject heat from the refrigerant. For example, the superheated vapor from compressor 144 may enter condenser 148 and transfer energy to air surrounding condenser 148 (e.g., to create a flow of heated air). In this manner, the refrigerant condenses into a saturated liquid and/or liquid vapor mixture. A condenser fan (not shown) may be positioned adjacent condenser 148 and may facilitate or urge the flow of heated air across the coils of condenser 148 (e.g., from ambient atmosphere) in order to facilitate heat transfer.

According to the illustrated embodiment, an expansion device or a variable electronic expansion valve 150 may be further provided to regulate refrigerant expansion. During use, variable electronic expansion valve 150 may generally expand the refrigerant, lowering the pressure and temperature thereof. In this regard, refrigerant may exit condenser 148 in the form of high liquid quality/saturated liquid vapor mixture and travel through variable electronic expansion valve 150 before flowing through evaporator 146. Variable electronic expansion valve 150 is generally configured to be adjustable, e.g., such that the flow of refrigerant (e.g., volumetric flow rate in milliliters per second) through variable electronic expansion valve 150 may be selectively varied or adjusted.

Evaporator 146 is disposed downstream of variable electronic expansion valve 150 and is operable to heat refrigerant within evaporator 146, e.g., by absorbing thermal energy from air surrounding the evaporator (e.g., to create a flow of cooled air). For example, the liquid or liquid vapor mixture refrigerant from variable electronic expansion valve 150 may enter evaporator 146. Within evaporator 146, the refrigerant from variable electronic expansion valve 150 receives energy from the flow of cooled air and vaporizes into superheated vapor and/or high-quality vapor mixture. An air handler or evaporator fan 152 is positioned adjacent evaporator 146 and may facilitate or urge the flow of cooled air across evaporator 146 in order to facilitate heat transfer. From evaporator 146, refrigerant may return to compressor 144 and the vapor-compression cycle may continue.

As explained above, environmental control system 140 includes a sealed system 142 for providing a flow of heated air or a flow cooled air throughout climate-controlled chamber 122 as needed. To direct this air, environmental control system 140 may include a duct system 154 for directing the flow of temperature regulated air, identified herein simply as flow of air 156 (see, e.g., FIG. 3). In this regard, for example, evaporator fan 152 can generate a flow of cooled air as the air passes over evaporator 146 and a condenser fan (not shown) can generate a flow of heated air as the air passes over condenser 148.

This temperature-regulated flow of air 156 may be routed through a cooled air supply duct and/or heated air may be routed through a heated air supply duct (not shown). In this regard, it should be appreciated that environmental control system 140 may generally include a plurality of ducts, dampers, diverter assemblies, and/or air handlers to facilitate operation in a cooling mode, in a heating mode, in both a heating and cooling mode, or any other mode suitable for regulating the environment within climate-controlled chamber 122. It should be appreciated that duct system 154 may vary in complexity and may regulate the flows of air from sealed system 142 in any suitable arrangement through any suitable portion of climate-controlled chamber 122.

Although an exemplary sealed system 142 and duct system 154 are illustrated and described herein, it should be appreciated that variations and modifications may be made to sealed system 142 and/or duct system 154 while remaining within the scope of the present subject matter. For example, sealed system 142 may include additional or alternative components, duct system 154 may include additional or different ducting configurations, etc. For example, according to the illustrated embodiment, evaporator 146 and evaporator fan 152 may be positioned at top 104 of cabinet 102 and refrigerant may be routed from mechanical compartment 136 and through cabinet 102 to evaporator 146. In addition, it should be appreciated that gardening appliance 100 may have one or more subsystems integrated with or operably coupled to duct system 154 for filtering the flow of air 156, regulating the concentration of one or more gases within the flow of air 156, etc.

Referring now generally to FIGS. 1 through 7, gardening appliance 100 generally includes a rotatable carousel, referred to herein as a grow tower 160 that is mounted within liner 120, e.g., such that it is within climate-controlled chamber 122. More specifically, grow tower 160 may be positioned on top of a turntable 162 that is rotatably mounted to a sump 164 of gardening appliance 100. In general, grow tower 160 extends along the vertical direction V from sump 164 to a top wall 166 of climate-controlled chamber 122.

In addition, grow tower 160 is generally rotatable about a central axis 168 defined by turntable 162. Specifically, according to the illustrated embodiment, central axis 168 is parallel to the vertical direction V. However, it should be appreciated that central axis 168 could alternatively extend in any suitable direction, e.g., such as the horizontal direction (e.g., defined by the lateral direction L and the transverse direction T). In this regard, grow tower 160 generally defines an axial direction A, i.e., parallel to central axis 168, a radial direction R that extends perpendicular to central axis 168, and a circumferential direction C that extends around central axis 168 (e.g., in a plane perpendicular to central axis 168).

As illustrated, grow tower 160 may generally separate, divide, or partition climate-controlled chamber 122 into a plurality of grow chambers (e.g., identified generally by reference numeral 170). More specifically, grow chambers 170 are generally defined between grow tower 160 and liner 120 or between grow tower 160 and doors 130. In general, grow chambers 170 are intended to support the leafy growth of plants 124 (e.g., or other portions of plants 124 other than the plant roots). According to the illustrated embodiment, grow tower 160 divides climate control chamber 122 into three grow chambers 170, referred to herein generally as a first chamber, a second chamber, and a third chamber. As illustrated, these grow chambers 170 are circumferentially spaced relative to each other and define substantially separate and distinct growing environments. As such, each grow chamber 170 may receive plants 124 having different growth needs and the grow environment within each respective grow chamber 170 may be maintained as grow tower 160 is rotated within climate-controlled chamber 122.

In addition, according to the illustrated embodiment, grow tower 160 may generally define an internal chamber, referred to herein as a root chamber 172. In general, root chamber 172 may be substantially sealed relative to (or isolated from) grow chambers 170 and is configured for containing the roots of plants 124 throughout the growing process. As will be described in more detail below, grow tower 160 may generally define one or more apertures 174 that are defined through grow tower 160 to permit access between grow chambers 170 and root chamber 172. According to exemplary embodiments, these apertures 174 may be configured to receive plant pods 176 into root chamber 172.

Plant pods 176 generally contain seedlings, root balls, or other plant material for growing plants 124 positioned within a mesh or other support structure through which roots of plants 124 may grow within grow tower 160. A user may insert a portion of plant pod 176 (e.g., a seed end or root end) having the desired seeds through one of the plurality of apertures 174 into root chamber 172. A plant end (e.g., opposite the root end) of the plant pod 176 may remain within grow chamber 170 such that plants 124 may grow from grow tower 160 such that they are accessible by a user.

As will be explained below, water and other nutrients may be supplied to the root end of plant pods 176 within root chamber 172. For example, according to the illustrated embodiment, root chamber 172 may be operably coupled with sealed system 142 for facilitating suitable climate control within the root chamber 172, e.g., to achieve desirable growing conditions. Similarly, a hydration system may be configured to provide a flow of hydrating mist including water, nutrients, and other suitable constituents for providing the desirable growth environment for plants 124. According to exemplary embodiments, apertures 174 may be covered by a flat flapper seal or seal cap (not shown) to prevent hydrating mist from escaping root chamber 172 when no plant pod 176 is installed and to facilitate improved climate control within root chamber 172 and grow chambers 170.

Although grow tower 160 described and illustrated above includes a single root chamber 172, it should be appreciated that according to alternative exemplary embodiments, grow tower 160 may further include one or more internal dividers (not shown) that are positioned within root chamber 172 to divide root chamber 172 into a plurality of sub-chambers or root chambers. Each of these root chambers may be partially or substantially isolated from the other root chambers to facilitate independent climate control, hydration, gas regulation, etc. In addition, each of these root chambers may be in fluid communication with one of the plurality of grow chambers 170 through the plurality of apertures 174.

Notably, it may be desirable according to exemplary embodiments to form a fluid-tight seal between the grow tower 160 and liner 120. In this manner, as grow tower 160 rotates within climate-controlled chamber 122, grow chambers 170 may remain fluidly isolated from each other. Therefore, according to an exemplary embodiment, grow tower 160 may generally define a grow module diameter (e.g., defined by its substantially circular footprint formed in a horizontal plane). Similarly, enclosed back portion 126 of liner 120 may be substantially cylindrical and may define a liner diameter (not labeled). In order to prevent a significant amount of air from escaping between grow tower 160 and liner 120, and in order to fluidly isolate the various grow chambers 170, the liner diameter may be substantially equal to or slightly larger than the grow module diameter.

Figure 7:
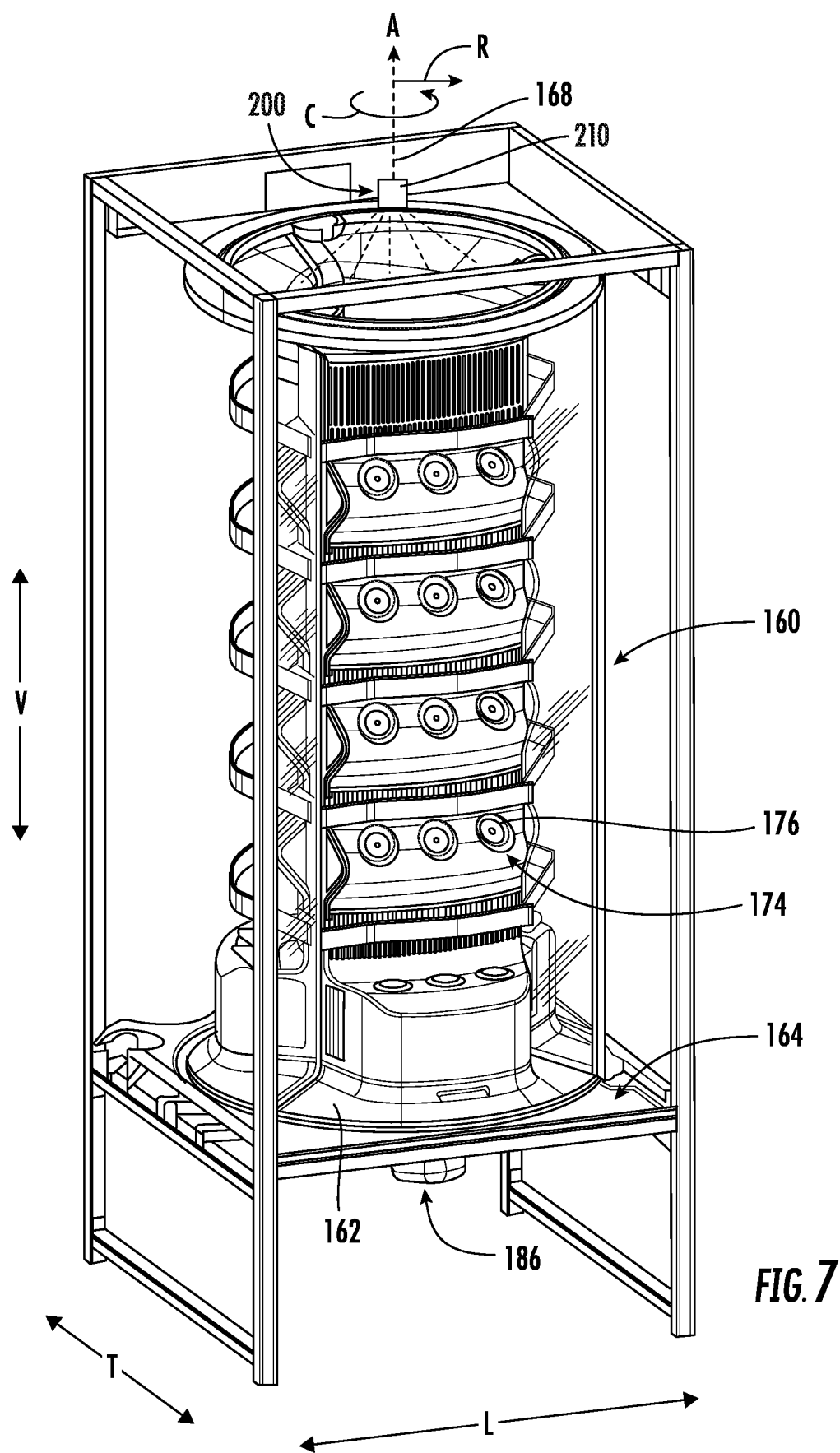
FIG. 7 is a perspective view of a grow tower of the example gardening appliance of FIG. 1.

As shown for example in FIG. 7, environmental control system 140 may further include a hydration system 200 which is generally configured for providing water and/or nutrients to plants 124 to support their growth. Specifically, as will be described in more detail below, hydration system 200 may be fluidly coupled to a water supply and or nutrient distribution assembly to selectively provide desirable quantities and concentrations of hydration, nutrients, and/or other fluids onto plants 124 to facilitate improved plant growth.

Notably, environmental control system 140 described above is generally configured for regulating the temperature and humidity (e.g., or some other suitable water level quantity or measurement) within one or all of the plurality of chambers 170 and/or root chambers 172 independently of each other. In this manner, a versatile and desirable growing environment may be obtained for each and every chamber 170.

Figure 5:
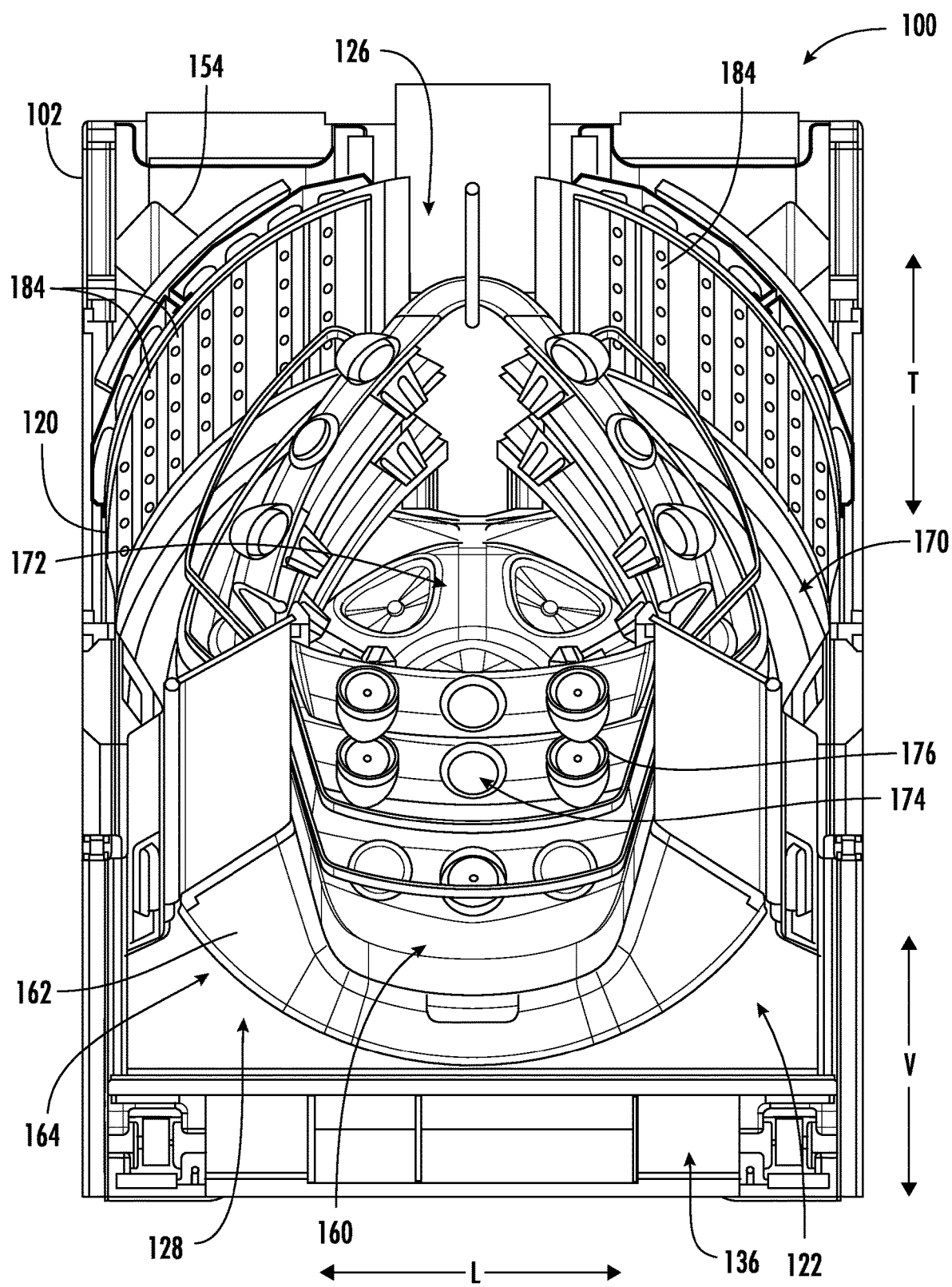
FIG. 5 is a perspective, section view of the example gardening appliance of FIG. 1 taken along Line 5-5 in FIG. 2.
Figure 6:
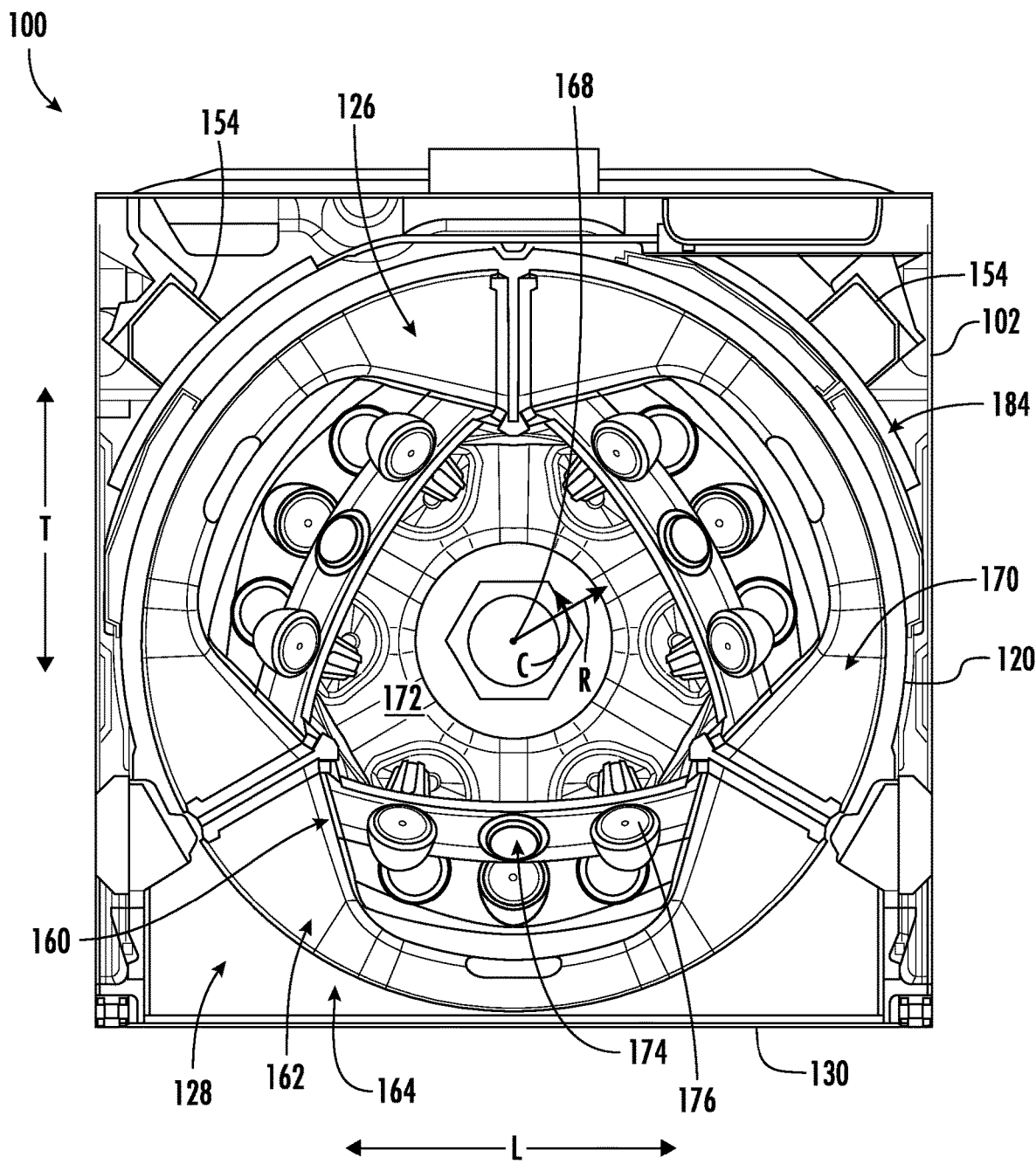
FIG. 6 is a top, section view of the example gardening appliance of FIG. 1 taken along Line 5-5 in FIG. 2.

Referring now for example to FIGS. 5 and 6, gardening appliance 100 may further include a light assembly 184 which is generally configured for providing light into selected grow chambers 170 to facilitate photosynthesis and growth of plants 124. As shown, light assembly 184 may include a plurality of light sources (not labeled) stacked in an array, e.g., extending along the vertical direction V. For example, light assembly 184 may be mounted directly to liner 120 within climate-controlled chamber 122 or may alternatively be positioned behind liner 120 such that light is projected through a transparent window or light pipe into climate-controlled chamber 122. The position, configuration, and type of light sources described herein are not intended to limit the scope of the present subject matter in any manner.

Light assembly 184 may include any suitable number, type, position, and configuration of electrical light source(s), using any suitable light technology and illuminating in any suitable color. For example, according to the illustrated embodiment, light assembly 184 includes one or more light emitting diodes (LEDs), which may each illuminate in a single color (e.g., white LEDs), or which may each illuminate in multiple colors (e.g., multi-color or RGB LEDs) depending on the control signal from controller 196. However, it should be appreciated that according to alternative embodiments, light assembly 184 may include any other suitable traditional light bulbs or sources, such as halogen bulbs, fluorescent bulbs, incandescent bulbs, glow bars, a fiber light source, etc. Light assembly 184 may also include ultraviolet (UV) emitters operable to emit ultraviolet rays.

As explained above, light generated from light assembly 184 may result in light pollution within a room where gardening appliance 100 is located. Therefore, aspects of the present subject matter are directed to features for reducing light pollution, or to the blocking of light from light assembly 184 through front display opening 128. Specifically, as illustrated, light assembly 184 is positioned only within the enclosed back portion 126 of liner 120 such that only grow chambers 170 which are in a sealed position are exposed to light from light assembly 184. Specifically, grow tower 160 acts as a physical partition between light assemblies 184 and front display opening 128. In this manner, as illustrated in FIG. 5, no light may pass from the first or second grow chambers 170 (i.e., the "rear" or enclosed grow chambers 170) through grow tower 160 and out through front display opening 128. As grow tower 160 rotates, two of the three grow chambers 170 will receive light from light assembly 184 at a time. According to still other embodiments, a single light assembly may be used to reduce costs, whereby only a single grow chamber 170 will be illuminated at a single time.

Referring now specifically to FIGS. 3 and 7, gardening appliance 100 may further include a motor assembly 186 or another suitable driving element or device for selectively rotating grow tower 160 during operation of gardening appliance 100. In this regard, according to the illustrated embodiment, motor assembly 186 is positioned below grow tower 160, e.g., within mechanical compartment 136, and may be mechanically coupled to turntable 162 for selectively rotating turntable 162 and grow tower 160 about central axis 168.

As used herein, "motor" may refer to any suitable drive motor and/or transmission assembly for rotating turntable 162 and grow tower 160. For example, motor assembly 186 may include a brushless DC electric motor, a stepper motor, or any other suitable type or configuration of motor. For example, motor assembly 186 may include an AC motor, an induction motor, a permanent magnet synchronous motor, or any other suitable type of AC motor. In addition, motor assembly 186 may include any suitable transmission assemblies, clutch mechanisms, or other components.

Referring again to FIG. 2, gardening appliance 100 may include a control panel 190 that may represent a general-purpose Input/Output ("GPIO") device or functional block for gardening appliance 100. In some embodiments, control panel 190 may include or be in operative communication with one or more user input devices 192, such as one or more of a variety of digital, analog, electrical, mechanical, or electro-mechanical input devices including rotary dials, control knobs, push buttons, toggle switches, selector switches, and touch pads.

Additionally, gardening appliance 100 may include a display 194, such as a digital or analog display device generally configured to provide visual feedback regarding the operation of gardening appliance 100. For example, display 194 may be provided on control panel 190 and may include one or more status lights, screens, or visible indicators. According to exemplary embodiments, user input devices 192 and display 194 may be integrated into a single device, e.g., including one or more of a touchscreen interface, a capacitive touch panel, a liquid crystal display (LCD), a plasma display panel (PDP), a cathode ray tube (CRT) display, or other informational or interactive displays.

Gardening appliance 100 may further include or be in operative communication with a processing device or a controller 196 that may be generally configured to facilitate appliance operation. In this regard, control panel 190, user input devices 192, and display 194 may be in communication with controller 196 such that controller 196 may receive control inputs from user input devices 192, may display information using display 194, and may otherwise regulate operation of gardening appliance 100. For example, signals generated by controller 196 may operate gardening appliance 100, including any or all system components, subsystems, or interconnected devices, in response to the position of user input devices 192 and other control commands. Control panel 190 and other components of gardening appliance 100 may be in communication with controller 196 via, for example, one or more signal lines or shared communication busses. In this manner, Input/Output ("I/O") signals may be routed between controller 196 and various operational components of gardening appliance 100.

As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 196 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 196 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

For example, controller 196 may be operable to execute programming instructions or micro-control code associated with an operating cycle of gardening appliance 100. In this regard, the instructions may be software or any set of instructions that when executed by the processing device, cause the processing device to perform operations, such as running one or more software applications, displaying a user interface, receiving user input, processing user input, etc. Moreover, it should be noted that controller 196 as disclosed herein is capable of and may be operable to perform any methods, method steps, or portions of methods as disclosed herein. For example, in some embodiments, methods disclosed herein may be embodied in programming instructions stored in the memory and executed by controller 196.

The memory devices may also store data that can be retrieved, manipulated, created, or stored by the one or more processors or portions of controller 196. The data can include, for instance, data to facilitate performance of methods described herein. The data can be stored locally (e.g., on controller 196) in one or more databases and/or may be split up so that the data is stored in multiple locations. In addition, or alternatively, the one or more database(s) can be connected to controller 196 through any suitable network(s), such as through a high bandwidth local area network (LAN) or wide area network (WAN). In this regard, for example, controller 196 may further include a communication module or interface that may be used to communicate with one or more other component(s) of gardening appliance 100, controller 196, an external appliance controller, or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

According to an exemplary embodiment, motor assembly 186 may be operably coupled to controller 196, which is programmed to rotate grow tower 160 according to predetermined operating cycles, based on user inputs (e.g., via touch buttons 192), etc. In addition, controller 196 may be communicatively coupled to one or more sensors, such as temperature or humidity sensors, positioned within the various chambers 170 for measuring temperatures and/or humidity, respectively. Controller 196 may then operate motor assembly 186 in order to maintain desired environmental conditions for each of the respective chambers 170. For example, as described herein, gardening appliance 100 includes features or subsystems for providing certain locations of gardening appliance 100 with light, temperature control, proper moisture, nutrients, and other requirements for suitable plant growth. Motor assembly 186 may be used to position specific chambers 170 where needed to receive such growth requirements.

According to an exemplary embodiment, such as where grow tower 160 divides climate-controlled chamber 122 into three grow chambers 170, controller 196 may operate motor assembly 186 to index grow tower 160 sequentially through a number of preselected positions. More specifically, motor assembly 186 may rotate grow tower 160 in a counterclockwise direction (e.g., when viewed from a top of grow tower 160) in 120° increments to move chambers 170 between sealed positions and display positions. As used herein, a chamber 170 is considered to be in a "sealed position" when that chamber 170 is substantially sealed between grow tower 160 and liner 120. By contrast, a chamber 170 is considered to be in a "display position" when that chamber 170 is at least partially exposed to front display opening 128, such that a user may access plants 124 positioned within that chamber 170.

Figure 4:
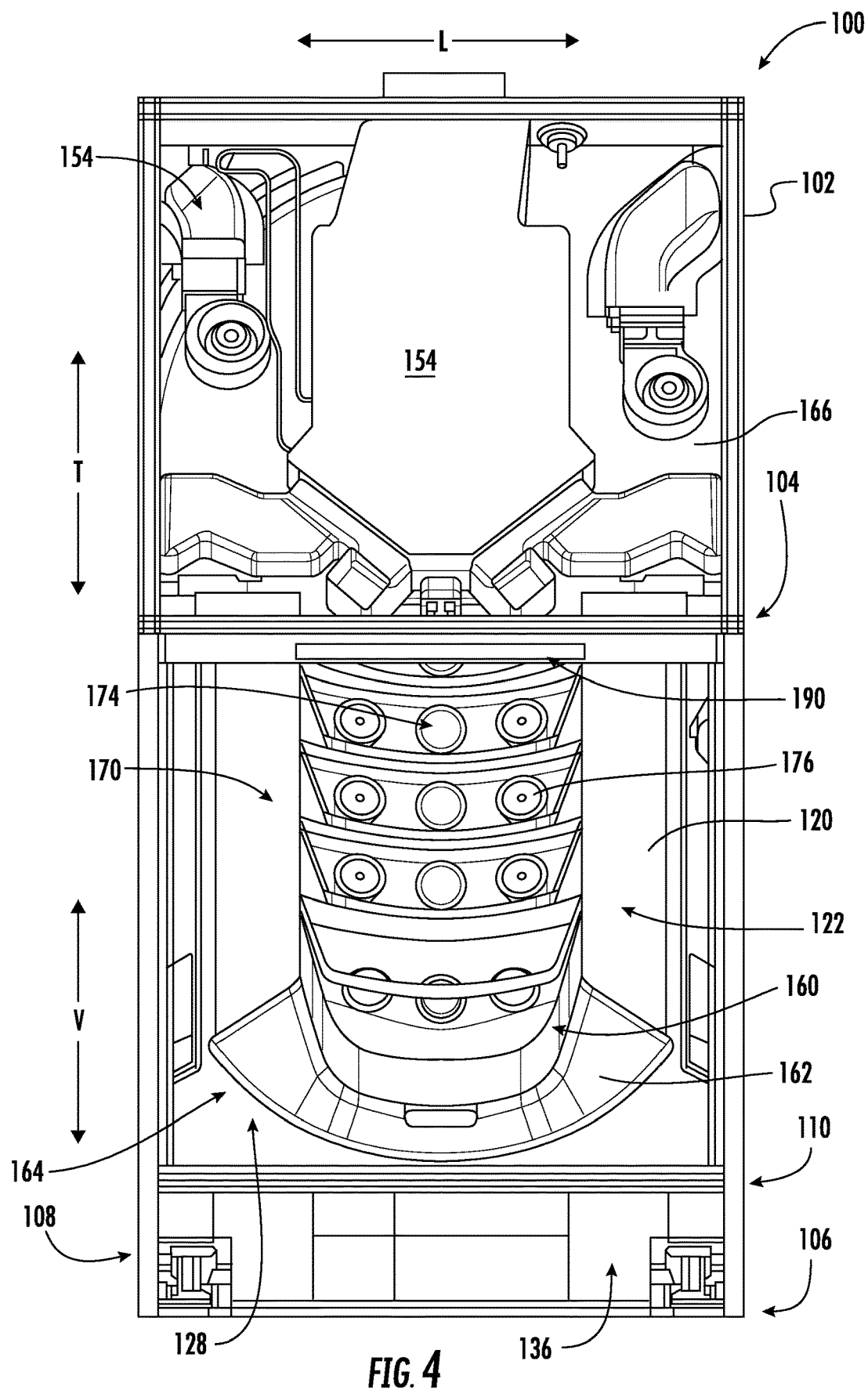
FIG. 4 is a top, perspective view of the example gardening appliance of FIG. 1 with a top panel and doors shown removed.

For example, as illustrated in FIGS. 4 and 5, the first grow chamber and the second grow chamber (i.e., the rear chambers) are both in a sealed position, whereas the third grow chamber (i.e., the front chamber) is in a display position. As motor assembly 186 rotates grow tower 160 by 120 degrees in the counterclockwise direction, the second grow chamber will enter the display position, while the first grow chamber and the third grow chamber will be in the sealed positions. Motor assembly 186 may continue to rotate grow tower 160 in such increments to cycle grow chambers 170 between these sealed and display positions.

Gardening appliance 100 and grow tower 160 have been described above to explain an exemplary embodiment of the present subject matter. However, it should be appreciated that variations and modifications may be made while remaining within the scope of the present subject matter. For example, according to alternative embodiments, gardening appliance 100 may be a simplified to a two-chamber embodiment with a square liner 120 and a grow tower 160 that divides the climate-controlled chamber 122 in half to define a first grow chamber and a second grow chamber. According to such an embodiment, by rotating grow tower 160 by 200 degrees about central axis 168, the first chamber may alternate between the sealed position (e.g., facing rear side 114 of cabinet 102) and the display position (e.g., facing front side 112 of cabinet 102). By contrast, the same rotation will move the second chamber from the display position to the sealed position.

According to still other embodiments, gardening appliance 100 may include a three chamber grow tower 160 but may have a modified cabinet 102 such that front display opening 128 is wider and two of the three grow chambers 170 are displayed at a single time. Thus, the first grow chamber may be in the sealed position, while the second grow chamber and the third grow chamber may be in the display positions. As grow tower 160 is rotated counterclockwise, the first grow chamber is moved into the display position and the third grow chamber is moved into the sealed position.

Figure 8:
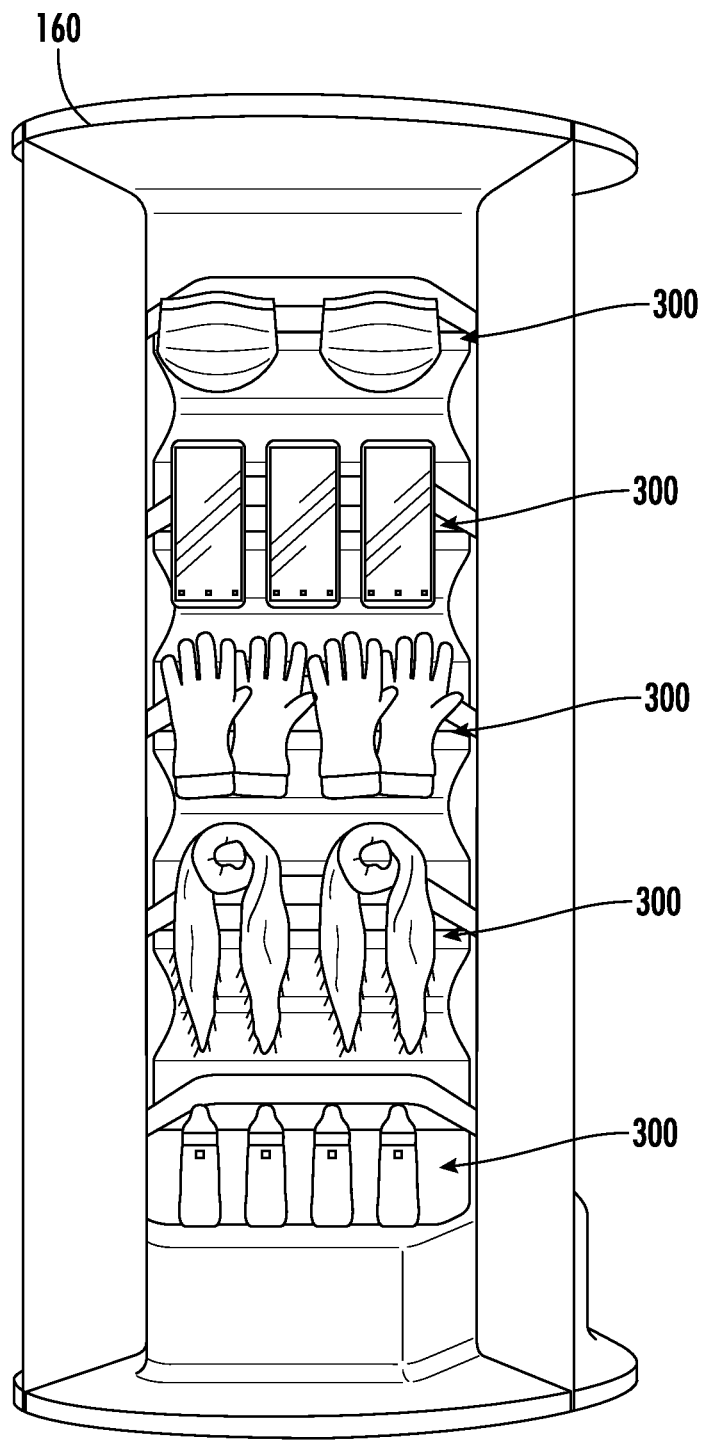
FIG. 8 is a schematic view of certain components of the example gardening appliance of FIG. 1.

FIG. 8 is a schematic view of certain components of gardening appliance 100. Moreover, a plurality of objects 300 are positioned on grow tower 160. Objects 300 are not plants 124 or plant pods 126. Rather, objects 300 may include any object or combination of objects that a user of gardening appliance 100 would like to sanitize. For instance, objects 300 may include one or more of a bottle, a glove, a mask, a scarf, a phone, a toy, an eating utensil, clothing, a toothbrush, hairbrush, etc. A user of gardening appliance 100 may load objects 300 onto grow tower 160 and sanitize objects 300 during a sanitization cycle of gardening appliance 100. Objects 300 may be loaded onto grow tower 160 at apertures 174. Moreover, objects 300 may be loaded onto grow tower 160 at various rows of apertures 174, e.g., such that objects 300 are arranged in rows on grow tower 160. Plant pods 176 may be removed from grow tower 160 prior to loading objects 300.

Figure 9:
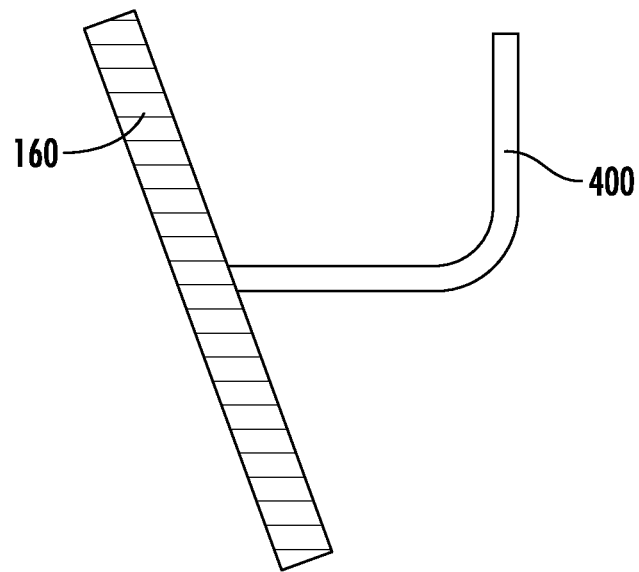
FIG. 9 is a side, section view of a hook installed on the example gardening appliance of FIG. 1.
Figure 10:
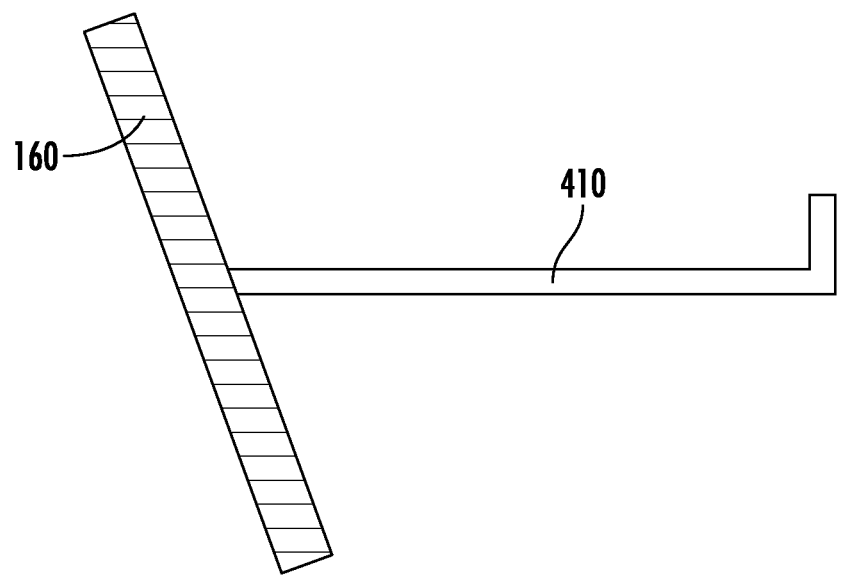
FIG. 10 is a side, section view of a shelf installed on the example gardening appliance of FIG. 1.

FIGS. 9 and 10 show a hook 400 (FIG. 9) and a shelf 410 (FIG. 10) installed grow tower 160. Hook 400 and/or shelf 410 may be selectively mounted on grow tower 160 at one or more of apertures 174. For instance, a base of hook 400 may be positioned within one of apertures 174 such that hook 400 extends outwardly from grow tower 160 as shown in FIG. 9. One or more of objects 300, such as a mask, a glove, a scarf, etc., may be hung on hook 400 when hook 400 is mounted to grow tower 160. As another example, each base of shelf 410 may be positioned within a respective one of apertures 174 such that shelf 410 is cantilevered from grow tower 160 as shown in FIG. 10. One or more of objects 300, such as a bottle, a phone, etc., may be placed on shelf 410 when shelf 410 is mounted to grow tower 160.

Figure 11:
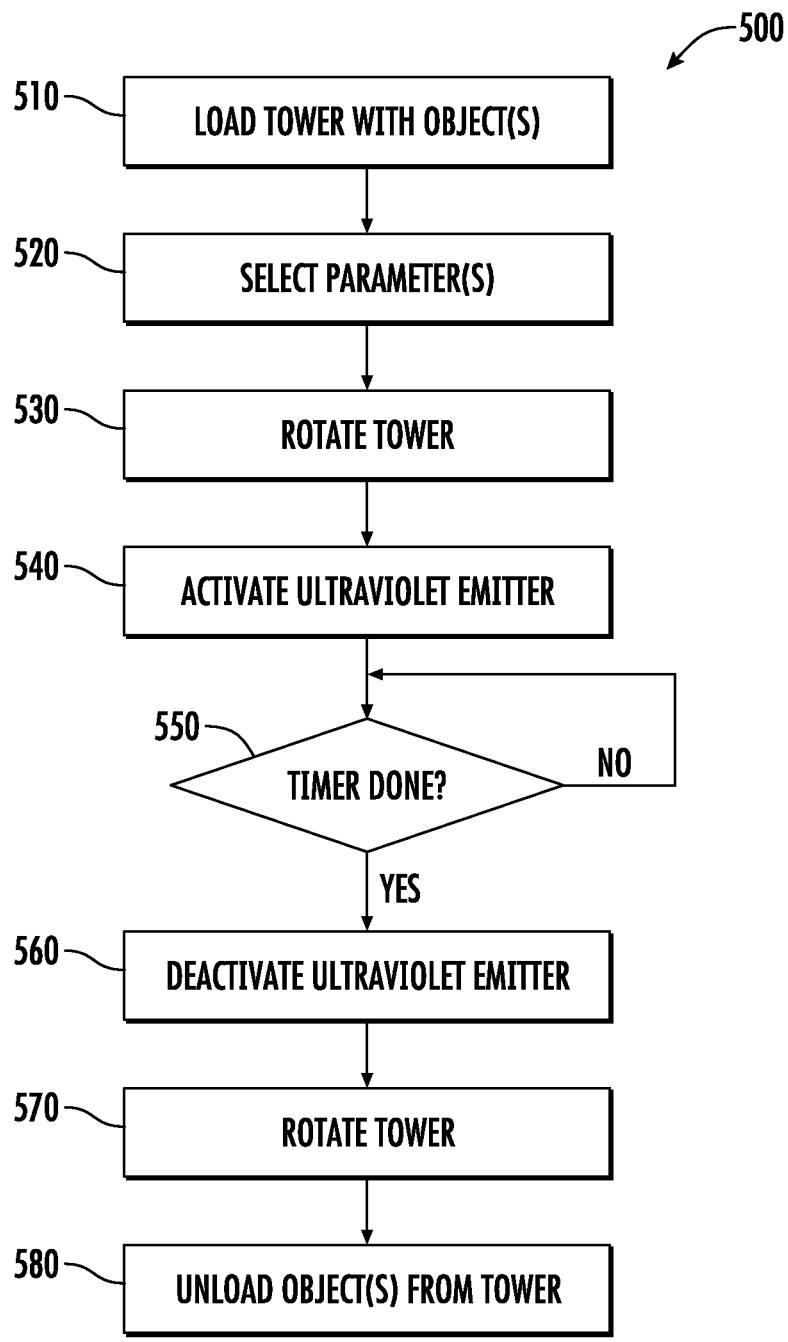
FIG. 11 illustrates a method for sanitizing objects within a gardening appliance according to an example embodiment of the present subject matter.

FIG. 11 illustrates a method 500 for sanitizing objects within a gardening appliance according to an example embodiment of the present subject matter. As an example, method 500 may be used in or with gardening appliance 100 to assist with sanitizing object(s) on grow tower 160. Moreover, controller 196 of gardening appliance 100 may be programmed or configured to at least partially implement method 500. While method 500 is described in greater detail below in the context of gardening appliance 100, it will be understood that method 500 may be used in or within any suitable gardening appliance in alternative example embodiments.

At 510, object(s) 300 may be positioned on grow tower 160. For example, a user may open doors 130 to access the one of grow chambers 170 facing doors 130. The user may then load object(s) 300 onto grow tower 160. For instance, the user may utilize hooks 400 and/or shelves 410 to load object(s) 300 onto grow tower 160 at 510. Any suitable object other than plants may be added to grow tower 160 at 510.

At 520, one or more parameters of a sanitization cycle for object(s) 300 may be selected. For example, a user may input the one or more parameters for the sanitization cycle at control panel 190 or another interface, such as a smartphone app. The one or more parameters of the sanitization cycle may include one or more of a temperature, a humidity, an intensity of light assembly 184, and a duration of the sanitization cycle. In certain example embodiments, one or more of the parameters for the sanitization cycle may be a default value, e.g., when the user does not select a particular value for the parameter.

Controller 196 may be configured for operating light assembly 184 and motor assembly 186 according to the one or more parameters for the sanitization cycle. Thus, at 530, grow tower 160 may be rotated such that object(s) 300 on grow tower 160 are exposed to light assembly 184 during the sanitization cycle. Controller 196 may activate motor assembly 186 to rotate grow tower 160 to move object(s) 300 from the one of grow chambers 170 facing doors 130 into one of grow chambers 170 with light assembly 184. In addition, at 540, light assembly 184 may be activated such that object(s) 300 on grow tower 160 are illuminated by ultraviolet rays from light assembly 184. Thus, controller 196 may activate light assembly 184 to illuminate object(s) with ultraviolet rays from light assembly 184 at 540. The ultraviolet rays from light assembly 184 may eliminate or reduce germs, such as viruses and bacteria, on object(s) 300. In certain example embodiments, grow tower 160 may remain or dwell with object(s) 300 facing towards light assembly 184, e.g., by deactivating motor assembly 186, during the sanitization cycle.

At 550, a timer for the sanitization cycle may be monitored. Until the timer expires, controller 196 may keep grow tower 160 stationary with light assembly 184 activated to sanitize object(s) 300 with ultraviolet rays from light assembly 184. The duration of the timer may be selected to sanitize object(s) 300. For instance, the duration of the timer at 550 may be one minute, two minutes, three minutes, five minutes, ten minutes, etc. When the timer expires, light assembly 184 may be deactivated at 560. Moreover, controller 196 may deactivate light assembly 184 to terminate the illumination of objects by ultraviolet rays from light assembly 184. Thus, the sanitization of object(s) 300 by ultraviolet rays from light assembly 184 may stop at 560. Method 500 may also include terminating the sanitization cycle in response to the door(s) 130 opening. Thus, controller 196 may deactivate light assembly 184 when the door(s) 130 open during the sanitization cycle.

At 570, grow tower 160 may be rotated such that object(s) 300 on grow tower 160 are removable from gardening appliance 100. Controller 196 may activate motor assembly 186 to rotate grow tower 160 to move object(s) 300 from the one of grow chambers 170 with light assembly 184 to the one of grow chambers 170 facing doors 130. At 580, object(s) 300 may be removed from grow tower 160 after the sanitization cycle. For example, a user may open doors 130 to access the one of grow chambers 170 facing doors 130. The user may then unload object(s) 300 from grow tower 160, e.g., with object(s) having advantageously been sanitized by ultraviolet light within gardening appliance 100 during method 500.

Method 500 may also include notifying a user when the sanitization cycle is complete. For example, a light emitter or an audio emitter on gardening appliance 100 may be activated to alert the user when the sanitization cycle is complete. As another example, a text message or push-notification may be sent to a phone, tablet, or personal computer of the user of gardening appliance 100 to notify the user when the sanitization cycle is complete.

FIG. 11 depicts steps performed in a particular order for purposes of illustration and discussion. Those of ordinary skill in the art, using the disclosures provided herein, will understand that the steps of any of the methods discussed herein may be adapted, rearranged, expanded, omitted, or modified in various ways without deviating from the scope of the present disclosure.

As may be seen from the above, the present subject matter provides a system and method to sanitize objects, such as baby bottles, face masks, clothes, phones cases, etc., in a home gardening appliance, e.g., with UV LEDs normally used to grow plants therein. Thus, e.g., an appliance designed for growing plants may advantageously be used for another purpose, namely, sanitizing objects.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for sanitizing objects within a gardening appliance comprising a cabinet, a sump disposed at the cabinet, a turntable rotatable mounted to the sump, a grow tower positioned on top of the turntable and extending from the sump to a top wall of the cabinet, the grow tower defining a plurality of apertures, a liner positioned within the cabinet to define an enclosed back portion, and an ultraviolet assembly positioned within the enclosed back portion to illuminate one or more objects with ultraviolet rays, the method comprising:

positioning at least one object on a grow tower of the gardening appliance;
during a sanitization cycle, rotating the turntable to rotate the grow tower such that the at least one object on the grow tower is exposed to an ultraviolet assembly within the enclosed back portion;
activating the ultraviolet assembly such that the at least one object on the grow tower is illuminated by ultraviolet rays from the ultraviolet assembly; and
after the sanitization cycle, removing the at least one object from the grow tower.

2. The method of claim 1, wherein positioning the at least one object on the grow tower comprises positioning the at least one object on a hook or a shelf attached at a plurality of apertures on the grow tower.

3. The method of claim 1, wherein positioning the at least one object on the grow tower comprises positioning a plurality of objects on the grow tower.

4. The method of claim 1, wherein:
the grow tower and the cabinet collectively define a plurality of chambers; and
the ultraviolet assembly is positioned at one of the plurality of chambers corresponding to the enclosed back portion.

5. The method of claim 4, wherein a door is mounted to the cabinet at another of the plurality of chambers.

6. The method of claim 5, wherein:
positioning the at least one object on the grow tower comprises positioning the at least one object on the grow tower at the another of the plurality of chambers; and
removing the at least one object from the grow tower comprises removing the at least one object from the grow tower at the another of the plurality of chambers.

7. The method of claim 1, further comprising selecting one or more parameters of the sanitization cycle.

8. The method of claim 7, wherein the one or more parameters of the sanitization cycle comprises one or more of a temperature, a humidity, an intensity of the ultraviolet assembly, and a duration of the sanitization cycle.

9. The method of claim 1, wherein one or more parameters of the sanitization cycle is a default value, and the one or more parameters of the sanitization cycle comprises one or more of a temperature, a humidity, an intensity of the ultraviolet assembly, and a duration of the sanitization cycle.

10. A gardening appliance, comprising:
a cabinet;
a sump disposed at the cabinet;
a turntable rotatable mounted to the sump;
a grow tower positioned on top of the turntable and extending from the sump to a top wall of the cabinet, the grow tower defining a plurality of apertures;
a liner positioned within the cabinet to define an enclosed back portion;
an ultraviolet assembly positioned within the enclosed back portion to illuminate one or more objects with ultraviolet rays; and
a controller in communication with the turntable and the ultraviolet assembly, the controller configured for
during a sanitization cycle, rotating the turntable to rotate the grow tower such that at least one object on the grow tower is exposed to ultraviolet assembly within the enclosed back portion of the gardening appliance;
activating the ultraviolet assembly such that the at least one object on the grow tower is illuminated by ultraviolet rays from the ultraviolet assembly; and
after the sanitization cycle, removing the at least one object from the grow tower.

11. The gardening appliance of claim 10, further comprising a hook or a shelf attached to the grow tower at the plurality of apertures, the at least one object mountable on the grow tower at the hook or the shelf.

12. The gardening appliance of claim 10, wherein the grow tower and the cabinet collectively define a plurality of chambers, and the ultraviolet assembly is positioned at one of the plurality of chambers corresponding to the enclosed back portion.

13. The gardening appliance of claim 12, further comprises a door mounted to the cabinet at another of the plurality of chambers.

14. The gardening appliance of claim 13, wherein the controller is further configured for:
operating a motor to rotate the grow tower to the another of the plurality of chambers at a start of the sanitization cycle; and
operating the motor to rotate the grow tower to the another of the plurality of chambers at an end of the sanitization cycle.

15. The gardening appliance of claim 10, wherein the controller is further configured for designating one or more parameters of the sanitization cycle based upon a user input.

16. The gardening appliance of claim 15, wherein the one or more parameters of the sanitization cycle comprises one or more of a temperature, a humidity, an intensity of the ultraviolet assembly, and a duration of the sanitization cycle.

17. The gardening appliance of claim 10, wherein one or more parameters of the sanitization cycle is a default value, and the one or more parameters of the sanitization cycle comprises one or more of a temperature, a humidity, an intensity of the ultraviolet assembly, and a duration of the sanitization cycle.

18. A method for sanitizing objects within a gardening appliance comprising a cabinet, a sump disposed at the cabinet, a turntable rotatable mounted to the sump, a grow tower positioned on top of the turntable and extending from the sump to a top wall of the cabinet, a liner positioned within the cabinet to define an enclosed back portion, and an ultraviolet assembly positioned within the enclosed back portion to illuminate one or more grow chambers in a sealed position with ultraviolet rays, the method comprising:
positioning at least one objection at a first grow chamber in a display position;
during a sanitization cycle, rotating the grow tower to move the first grow chamber to the sealed position;
activating the ultraviolet assembly such that the at least one object at the first grow chamber is illuminated by ultraviolet rays of the ultraviolet assembly;
rotating the grow tower to move the first grow chamber to the display position; and
after the sanitization cycle, removing the at least one object from the grow tower.

19. The method of claim 18, wherein positioning the at least one object on the grow tower comprises positioning the at least one object on a hook or a shelf attached at a plurality of apertures on the grow tower.

* * * * *